( 12 ) United States Patent
Beier et al.

(10) Patent No.: US 8,538,922 B2
(45) Date of Patent: Sep. 17, 2013

(54) NONDISRUPTIVE OVERFLOW AVOIDANCE OF TUPLE VALIDITY TIMESTAMPS IN TEMPORAL DATABASE SYSTEMS

(75) Inventors: Felix Beier, Benshausen (DE); Oliver Koeth, Stuttgart (DE); Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/901,972

(22) Filed: Oct. 11, 2010

(65) Prior Publication Data

US 2012/0089577 A1   Apr. 12, 2012

(51) Int. Cl.
*G06F 7/00* (2006.01)
*G06F 17/00* (2006.01)

(52) U.S. Cl.
USPC ............ 707/634; 707/639; 707/640; 711/162

(58) Field of Classification Search
USPC ............................ 707/634, 639, 640; 711/162
See application file for complete search history.

(56) References Cited

U.S. PATENT DOCUMENTS

| | | | |
|---|---|---|---|
| 6,081,507 A | | 6/2000 | Chao et al. |
| 6,148,309 A | | 11/2000 | Azagury et al. |
| 6,148,338 A | * | 11/2000 | Lachelt et al. ................. 709/224 |
| 6,243,702 B1 | * | 6/2001 | Bamford et al. ....................... 1/1 |
| 6,510,986 B1 | * | 1/2003 | Akutsu et al. ................. 235/379 |
| 6,996,580 B2 | * | 2/2006 | Bae et al. ............................... 1/1 |
| 2002/0152429 A1 | * | 10/2002 | Bergsten et al. ................. 714/43 |
| 2004/0268067 A1 | * | 12/2004 | Yamagami ..................... 711/159 |
| 2005/0091180 A1 | * | 4/2005 | Peleg et al. ......................... 707/1 |
| 2006/0167960 A1 | * | 7/2006 | Lomet ............................. 707/206 |
| 2007/0067583 A1 | * | 3/2007 | Zohar et al. .................... 711/162 |
| 2010/0094806 A1 | * | 4/2010 | Apostolides et al. ......... 707/637 |

\* cited by examiner

*Primary Examiner* — Shew-Fen Lin
(74) *Attorney, Agent, or Firm* — Cantor Colburn LLP; Elissa Wang

(57) ABSTRACT

A first epoch column pair includes a first global identification (ID) having first maximum value. A second epoch column pair includes a second global identification having second maximum value. The first epoch column pair receives first snapshots, and the first global ID increases with each of the first snapshots. When first global ID reaches first maximum value minus 1, switch to the second epoch column pair. The second epoch column pair receives second snapshots, and second global ID increases with each of the second snapshots. First global ID and first epoch column pair are reset, based on conditions. When second global ID reaches first maximum value minus 1, switch back to first epoch column pair. The first epoch column pair again receives first snapshots, and the first global ID increases with each of the second snapshots. Second global ID and second epoch column pair are reset, based on conditions.

13 Claims, 9 Drawing Sheets

FIRST SNAPSHOT GLOBAL ID INCREASES FOR EACH SNAPSHOT (S) REFERENCING THE FIRST EPOCH COL. PAIR 110

SECOND SNAPSHOT GLOBAL ID INCREASES FOR EACH SNAPSHOT (S) REFERENCING THE SECOND EPOCH COL. PAIR 120

| | FIRST EPOCH COLUMN PAIR 110 | | SECOND EPOCH COLUMN PAIR 120 | |
|---|---|---|---|---|
| | 1st CREATE TIMESTAMP COLUMN (tc1) | 2nd END TIMESTAMP COLUMN (te1) | 1st CREATE TIMESTAMP COLUMN (tc2) | 2nd END TIMESTAMP COLUMN (te2) |
| Tuple 1 (data) | $t_{1c1}$ | $t_{1e1}$ | $t_{1c2}$ | $t_{1e2}$ |
| Tuple 2 | $t_{2c1}$ | $t_{2e1}$ | $t_{2c2}$ | $t_{2e2}$ |
| Tuple 3 | $t_{3c1}$ | $t_{3e1}$ | $t_{3c2}$ | $t_{3e2}$ |
| Tuple N | $t_{nc1}$ | $t_{ne1}$ | $t_{nc2}$ | $t_{ne2}$ |

ROWS

112 FIRST COUNTER

122 SECOND COUNTER

FIG. 3

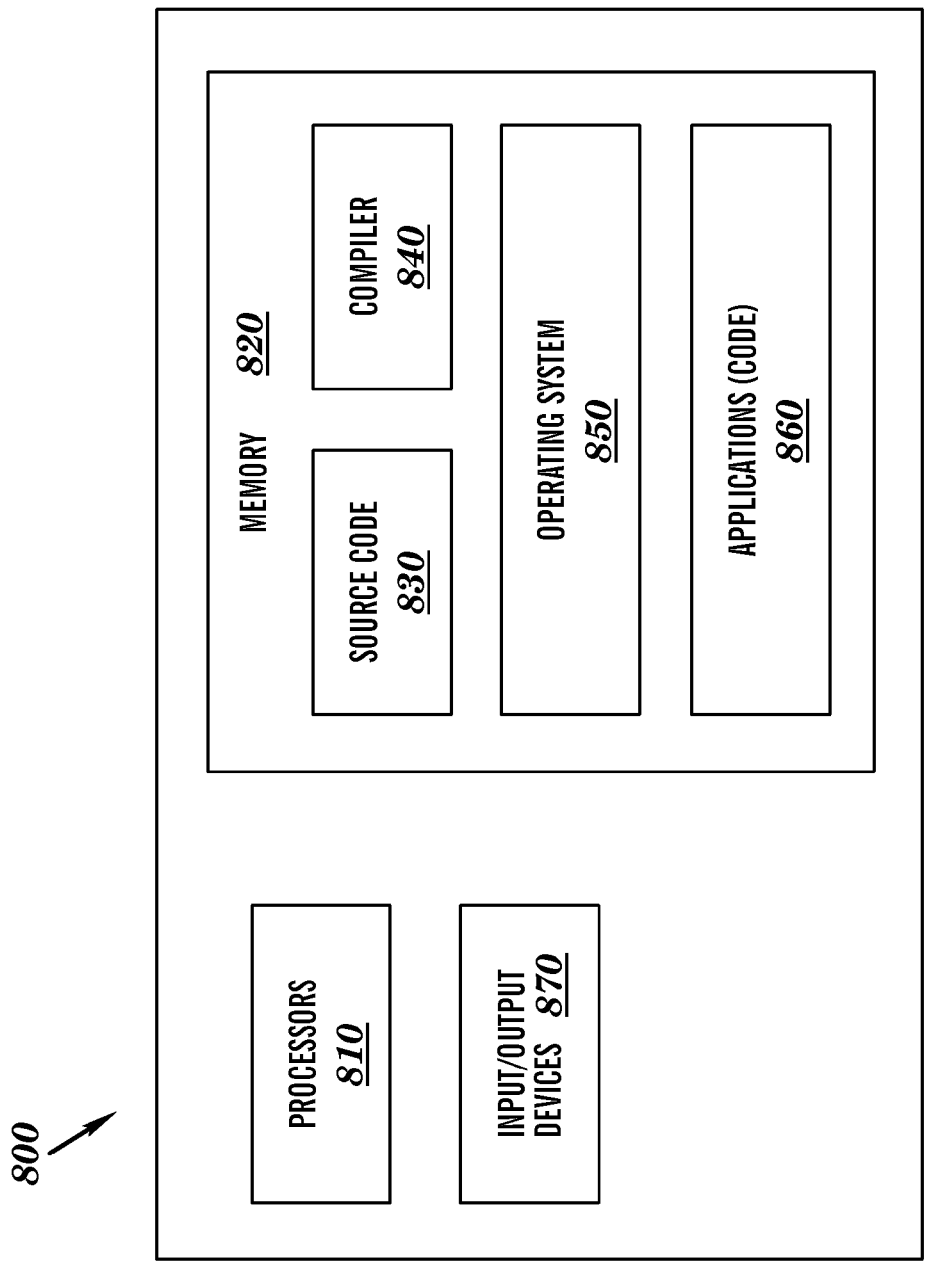

NONDISRUPTIVE OVERFLOW AVOIDANCE OF TUPLE VALIDITY TIMESTAMPS IN TEMPORAL DATABASE SYSTEMS

BACKGROUND

Exemplary embodiments relate to database systems, and more specifically, to timestamps in database systems.

In modern database systems, high availability and fast query response times are important requirements. Especially in the field of analytical decision support systems, the trend changes from infrequent analyses within large time intervals to mandatory analyses in daily business. Therefore, techniques have been developed by vendors of commercial business intelligence data warehouse systems to provide 24×7 availability and fast query processing for ad hoc reporting. Since updates of warehouse data are mostly processed batch wise in larger time intervals, queries can still be processed in the meantime on the old warehouse state without downtime if a snapshot semantic is used. This leads to an approach used in temporal databases where each tuple has timestamps defining its validity.

To achieve short query response times, massive parallel processing is used where the entire warehouse data is kept in main memory for fast access. Despite the fact that main memory becomes cheaper, main memory is still a critical resource since the amount of data in the warehouses grows dramatically. Thus, it would be good to keep data volumes as low as possible. Furthermore, latency due to main memory access evolves to the new bottleneck in efficient computation because processor speed grows faster than access speed in random access memory (RAM) chips. Therefore, data structures should be designed in a way that the main memory hierarchy is optimally utilized with faster but smaller caches.

BRIEF SUMMARY

According to exemplary embodiments, a computer includes memory for storing a program. A first epoch column pair includes a first global identification (ID), and the first global ID has an available first maximum value. A second epoch column pair includes a second global identification, and the second global ID has an available second maximum value. A processor is functionally coupled to the memory, and the processor is responsive to computer-executable instructions contained in the program. The processor is operative for receiving first snapshots to the first epoch column pair, where the first global ID increases with each of the first snapshots. In response to determining that the first global ID reaches the first maximum value minus 1, the processor switches to the second epoch column pair. The processor receives second snapshots to the second epoch column pair, and the second global ID increases with each of the second snapshots. The processor resets the first global ID and resetting the first epoch column pair, based on conditions. In response to determining that the second global ID reaches the first maximum value minus 1, the processor switches back to the first epoch column pair. The processor again receives first snapshots to the first epoch column pair, and the first global ID increases with each of the second snapshots. The processor resets the second global ID and resetting the second epoch column pair, based on conditions.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 3 illustrates a graph in accordance with exemplary embodiments.

FIG. 8 illustrates an example of a computer having capabilities, which may be included in exemplary embodiments.

DETAILED DESCRIPTION

Exemplary embodiments provide a mechanism to limit the size of tuple validity timestamps (i.e., snapshot global timestamp identifications) to a minimum without running into problems of timestamp overflows after the maximum (memory size) value is reached. This leads to both, lower overall memory consumption and better caching behavior due to smaller values that have to be evaluated during query processing. The algorithm of exemplary embodiments is nondisruptive, i.e., the algorithm does not have an impact on the availability of the database system for query processing and/ or updates. Additionally, the algorithm introduces only a small memory overhead (which is a second auxiliary column pair discussed herein) and does not require creating shadow copies of the entire warehouse data.

Exemplary embodiments present an approach which can limit the memory size that is required to store validity timestamps in database systems using a snapshot semantic. Each update cycle creates a new snapshot which can be identified by a unique timestamp and/or identification (ID), which is called a snapshot global timestamp ID. Since a potentially infinite sequence of update operations (in which each update will have an increasing snapshot global timestamp ID) can be performed on the data in the database, a problem can occur if a fixed amount of memory is used to store this timestamp (i.e., this increasing snapshot global timestamp ID). The higher the update frequency (which increases the snapshot global timestamp ID), the sooner an overflow of the timestamp code will happen. This would lead to incorrect query results because on the one hand tuples marked as deleted before may be interpreted as still valid and on the other hand the tuples that have been created at a later point in time would not be regarded as valid anymore. This situation must be handled correctly to keep the continuous snapshot sequence.

To address this situation, exemplary embodiments are configured to prune outdated warehouse data snapshots (i.e., snapshot global timestamp IDs) as soon as they are not needed anymore and reset the timestamp values (e.g., reset the snapshot global timestamp ID to 0). All modifications are performed in-place without influencing query and/or update execution.

Figure 1:
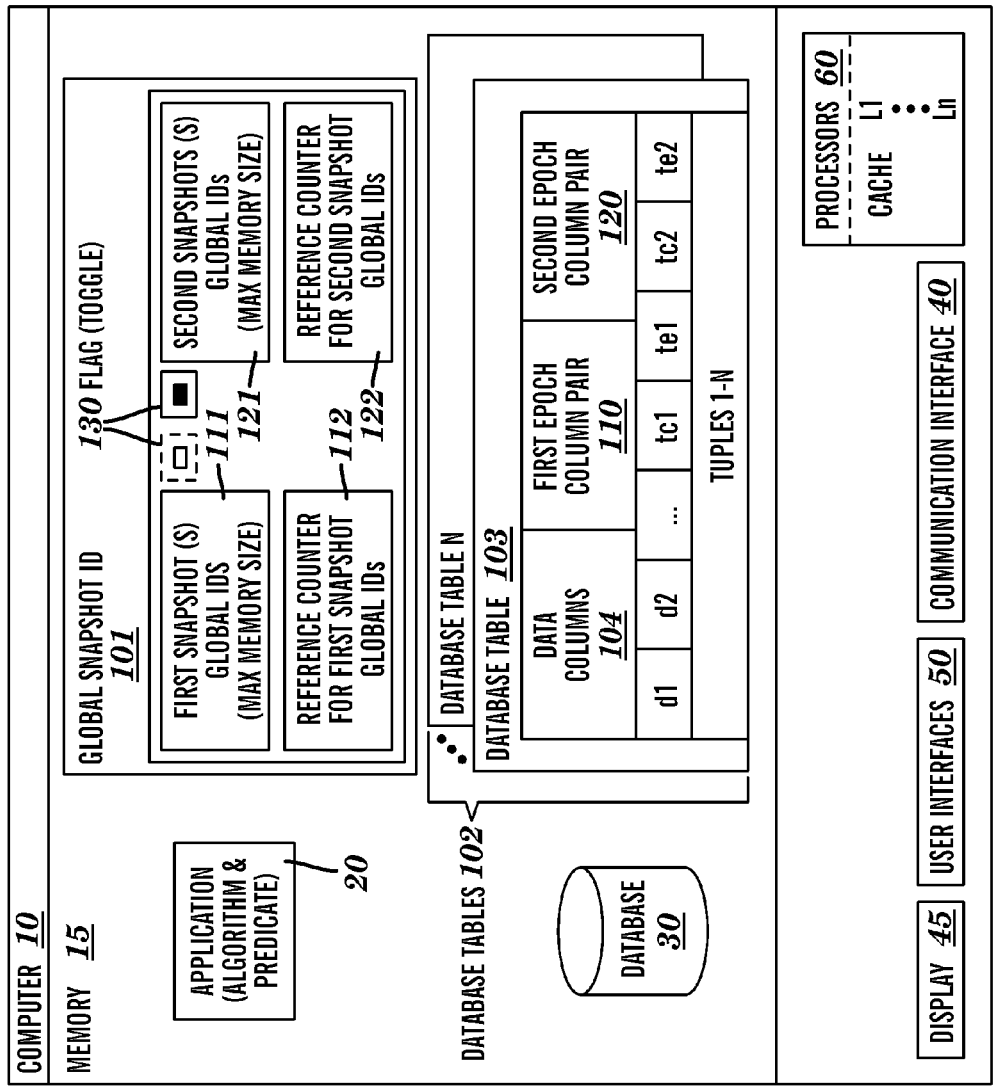
FIG. 1 illustrates a block diagram in accordance with exemplary embodiments.

Now turning to FIG. 1, FIG. 1 illustrates a block diagram 100 of a computer system 10 in accordance with exemplary embodiments.

The computer 10 may be one or more servers or any type of computing device, and the computer 10 may be operatively connected to a network. The computer 10 may include and/or be coupled to memory 15, a communication interface 40, a display 45, user interfaces 50, and processors 60. The communication interface 40 comprises hardware (including processors or microprocessors) and software for communicating over the network 120 such as Ethernet adapters, network interface cards (NIC), wireless adapters, network adapter, modems, and other circuitry. The user interfaces 50 may include, e.g., a track ball, mouse, pointing device, keyboard, touch screen, etc, for interacting with the computer 10, such as inputting information, making selections, etc. The processors 60 may include one or more caches as on processor memory.

The computer 10 includes memory 15 which may include and/or be a computer readable storage medium. The memory 15 may include one or more software applications such as application 20, and the application 20 is configured to implement the algorithm and to evaluate the predicate discussed herein. The application 20 may reside on or be coupled to the memory 15, and software application 20 comprises logic and software components (in the form of computer executable instructions) to operate and function in accordance with exemplary embodiments. Although the software application 20 is shown as a single element in FIG. 1 for conciseness, the application 20 may represent numerous software components (or modules) according to exemplary embodiments.

Tasks which can be executed by the system 10 and work on the data stored in the database tables 102 may either be working in a read only and/or a read/write mode on the data. Read only tasks will be referred to as queries, and read/write tasks as updates in the following.

The database 30 may consist of several database tables 102. Since a single update may affect several tables, the snapshot global timestamp ID 101 may be used to mark changes which span across tables. For simplifying the descriptions in the present disclosure, in the following it is assumed that only one database table 103 exists in the database 30. But the present disclosure is not limited in this respect, but can be applied on databases consisting on a plurality of tables.

All database tables 102 may store data tuples which may be stored in a plurality of data columns 104. But the way the data is stored in each database table is independent from following concepts of the present disclosure. To mark changes of each update with global snapshot timestamp IDs 101, each tuple of each database table 103 is extended by two auxiliary epoch column pairs 110, 120.

In the present disclosure, timestamp values 101 which are used to distinguish snapshots S and to indicate the validity of tuples may be referred as to epochs. In the present disclosure, since each snapshot has its own snapshot global timestamp ID 101 (i.e., timestamp value) at the time the snapshot is created, the term snapshot may be used interchangeably with snapshot global timestamp ID. The term snapshot global timestamp ID, snapshot ID, snapshot global ID, global ID, table epoch may be used interchangeably.

In FIG. 1, there is a first epoch column pair 110 and a second epoch column pair 120. The first epoch column pair 110 comprises a plurality of timestamp columns also called epoch columns, and the second epoch column pair 120 comprises a plurality of different timestamp columns also called epoch columns. Each epoch pair (for each tuple) of the first epoch column pair 110 has a create timestamp tc1 and an end (delete) timestamp te1 as shown in FIG. 3. Likewise, each epoch pair (for each tuple) of the second epoch column pair 120 has a create timestamp tc2 and an end timestamp te2. The application 20 is configured to utilize the first epoch column pair 110 and second epoch column pair 120 according to exemplary embodiments.

For the application 20 implementing the algorithm described herein, it is assumed that each tuple (e.g., tuples 1-N) of an epoch column pair (both the first and second epoch column pairs 110 and 120) contains two epoch columns which have been initialized to a start value during the load of the epoch column pair. FIG. 3 illustrates a conceptual view of epoch columns for the first epoch column pair 110 and the second epoch column pair 120. The first epoch column in each epoch column pair (tc) indicates the global snapshot timestamp ID 101 that was used for the update process when a tuple was created, and the second epoch column in each epoch column pair (te) indicates the global snapshot timestamp ID 101 that was used for the update process when the tuple is and/or should be deleted. The timestamps tc and te are stored for each tuple in the memory 15. For example, $t1c1$ and $t1e1$ (first epoch pair) may be stored for tuple 1 in the first epoch column pair 110.

Each task that is executed in the system 10 creates a (snapshot) view S on the currently active snapshot on the starting time. The currently active snapshot S is determined with the global snapshot timestamp ID 101 which may either be the global snapshot timestamp ID 111 for the first epoch column pair 110 or the global snapshot timestamp ID 121 for the second epoch column pair 120. Which of both is chosen, may be determined by a global flag 130 whose usage will be discussed in the following. The term "a task is referencing the first epoch column pair" will be used when a task uses the global snapshot timestamp ID 111 for creating a view S on a snapshot of the data stored in the database 30. The term "a task is referencing the second epoch column pair" will be used when a task uses the global snapshot timestamp ID 121 for creating a view S on a snapshot of the data stored in the database 30.

The present disclosure introduces two reference counters 112, 122 for tracking the number of active tasks referencing each epoch column pair. A first reference counter 112 is increased atomically when a task starts that references the first epoch column pair 110. The reference counter 112 is decreased atomically when a task referencing the first epoch column pair finishes. A second reference counter 122 is increased atomically when a task starts that references the second epoch column pair 120. The reference counter 122 is decreased atomically when a task referencing the second epoch column pair finishes.

The timestamp value of the snapshot global timestamp ID 101 increases (e.g., by 1 and/or any increment) each time a new snapshot S of the data (e.g., in the database 30 in FIG. 1) is taken at a different point in time. Each update to the database 30 causes a new snapshot to be taken of the data in the database 30 and causes the snapshot global timestamp ID 101 to increase (e.g., by 1) when the update commits.

All changes (inserts and deletes) are therefore committed only on success. Data values of a tuple will not be modified, but split into a deletion plus (+) a new insertion. Errors during the update can be easily handled by rolling back all changes flagged with the current update epoch (i.e., snapshot global timestamp ID).

Queries will use the snapshot global timestamp ID 101 that has been used by the most recent committed update. Queries started before an update committed will keep their (own) snapshot S view, because during a scan by the application 20, all tuples are evaluated (by application 20) with an additional predicate:

tc≦snapshot global timestamp ID (table epoch) on query start<te    (Equation 1).

In Equation 1, tc denotes the create epoch column of the epoch column pair which is referenced by the query, and to denotes the delete epoch column of the epoch column pair which is referenced by the query (depending on the highlighted flag 130).

This approach requires a continuously increasing sequence of snapshot global timestamp IDs 101 to hide modifications made by updates from concurrently running queries.

Figure 2:
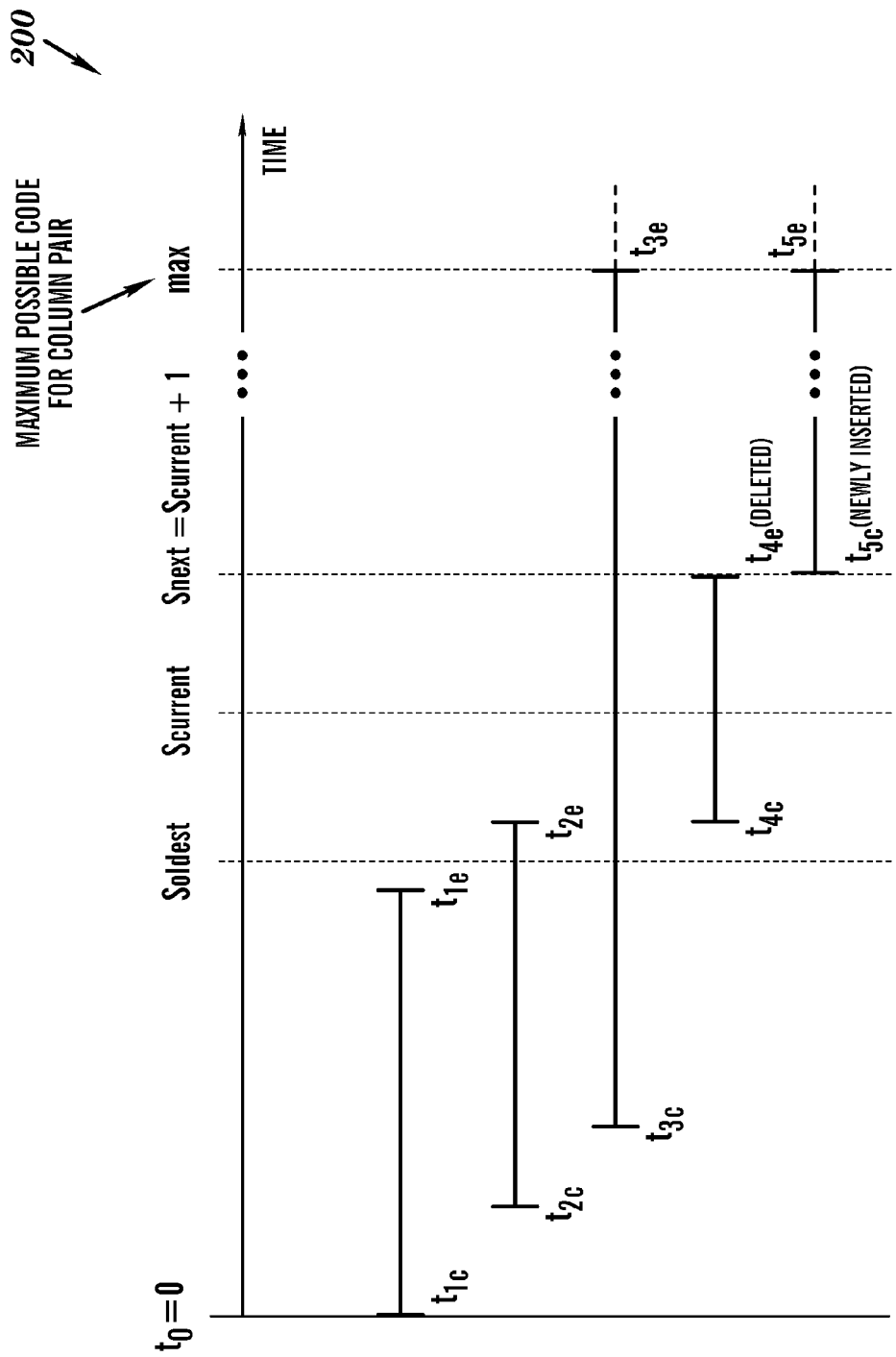
FIG. 2 illustrates a graph for a precondition according to exemplary embodiments.

FIG. 2 illustrates a snapshot semantic for a single epoch column pair such as the first epoch column pair 110. FIG. 2 provides a precondition for exemplary embodiments. FIG. 2 illustrates an example overflow of updates which eventually causes the sequence of snapshot global timestamp IDs 101 to continue increasing until the snapshot global timestamps IDs 101 reach the maximum possible code value according to a fixed number of bits that is used for each epoch ID code. The 'max' refers to the maximum value usable for the sequence of snapshot global timestamp IDs (e.g., 111, 121) for a particular epoch column pair that is being referenced, such as referenced to the first epoch column pair 110 or the second epoch column pair 120. Max is the maximum possible code value, which is also referred to as maximum value and maximum epoch value. According to exemplary embodiments discussed herein, the first epoch column pair 110 and the second epoch column pair 120 each have their own amount of memory in memory 15 reserved to the maximum possible code value (e.g., certain amount of bits, such as 16 bits). In exemplary embodiments, new snapshots (only) reference one epoch column pair which is the active epoch column pair (e.g., the second epoch column pair) as will be discussed further herein, but old snapshots (with lower snapshot global timestamp IDs) that reference the inactive epoch column pair (e.g., the first epoch column pair 110) may remain until all tasks (such as queries) are finished with the old snapshots.

Now, back to FIG. 2, the currently active epoch column pair may be without loss of generality the first epoch column pair 110. Without loss of generality, we assume that the initial epoch t0 is set to 0 as the smallest possible value. S indicates the points in time (i.e., designate the snapshot global timestamp ID used for S) when snapshots of the database 30 have been created. Each snapshot S may be used (referenced) by a plurality of queries and/or other tasks for creating a view on the data stored in the database 30, and each snapshot has been created by a former update to the system 10. $S_{oldest}$ is the snapshot used for the view of the oldest query still running in the computer system 10, consisting of tuples 2 and 3. Tuple 1 (valid from t1c to t1e) has been marked as deleted by a former update before the query referencing $S_{oldest}$ has started. In other words, the end timestamp t1e ended for tuple 1 before the $S_{oldest}$ snapshot global timestamp ID was taken. When a new query starts at this moment, it uses the currently active global epoch ID $S_{current}$ (snapshot global timestamp ID used by the most recent committed update) for creating a view on the data. In all data views using $S_{current}$, tuple 2 has already been marked as deleted but tuples 3 and 4 are still valid.

Currently, an update process (by the application 20) is running for creating a new snapshot $S_{next}=S_{current}+1$ (or any other increment), for deleting tuple 4, and for inserting a new tuple 5. The $S_{next}$ snapshot global timestamp ID is 1 (or any other increment) more than the $S_{current}$ snapshot global timestamp ID for hiding the modifications to $S_{current}$ for creating $S_{next}$ from all queries using a lower snapshot global timestamp ID 101 and evaluating the validity predicate (Equation 1) in application 20. When the update process commits successfully, the next active snapshot global timestamp ID 101 for new queries will be $S_{next}$.

Without loss of generality, a tuple not marked as deleted will have the code for the maximum possible epoch value (due to the encoding size) as its end epoch (i.e., te) (but other values may be possible). This is the initial value for the end epoch column which is written in the respective end epoch column during an update that inserted the tuple. The maximum possible code is a special value only used for this purpose. All updates therefore must use a snapshot global ID lower than this one for marking tuples as deleted.

When fixed code lengths for snapshot global timestamp IDs 101 (which are continuously increasing) are used, the maximum possible code value max will be reached sooner or later by an update. The max value therefore can not be used to mark tuples as deleted since the validity predicate in Equation 1 could not distinguish between tuples not marked as deleted (have the initial max value in end epoch column) and those which would be marked as deleted by the critical update (would use the max value for marking tuples as deleted). This situation is called an epoch global timestamp ID 101 overflow. The terms epoch overflow, timestamp overflow, overflow situation, and/or overflow may be used interchangeably in the following. To minimize memory 15 consumption of each tuple, it is furthermore desired to use only small codes for each epoch (timestamp) value, but this would result in a faster occurrence of an overflow situation.

Figure 4:
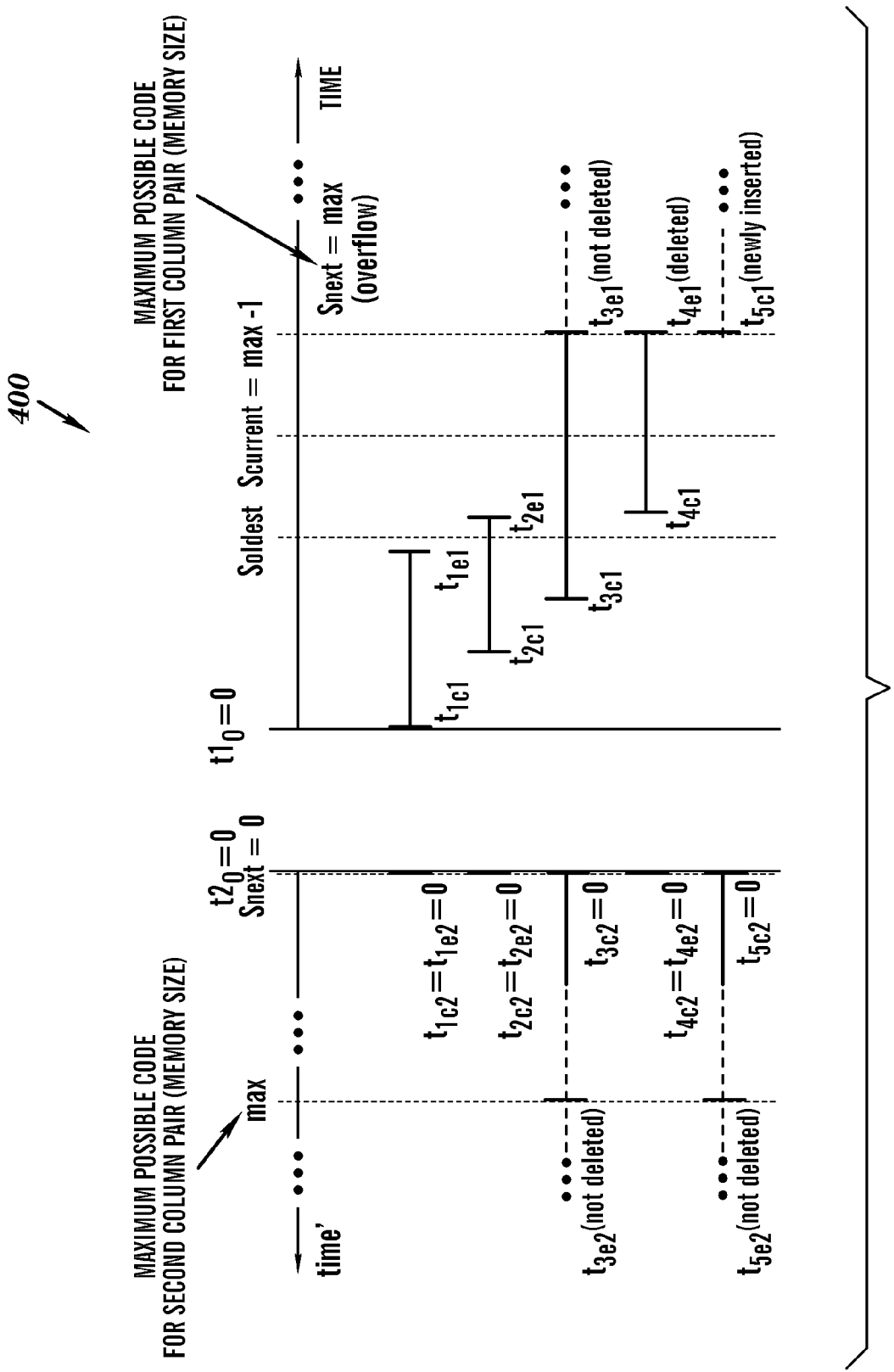
FIG. 4 illustrates a graph in accordance with exemplary embodiments.

An example for an overflow situation for the first epoch column pair 110 is shown on the right side in FIG. 4. The currently active snapshot global timestamp ID $S_{current}$ (of the most recent committed update) is assumed to be max−1. The next update causing the overflow would create a new snapshot with ID $S_{next}$=max. This critical update would newly insert tuple 5 and mark tuple 4 as deleted (marking changes with the used epoch ID $S_{next}$). Tuple 3 is not marked as deleted and should remain valid for creating new views on data snapshots, but due to the overflow, it can not be distinguished between tuple 3 marked not as deleted and tuple 4 marked as deleted by the critical update.

For state of the art systems using only one epoch column pair, the maximum value for the first epoch column pair 110 would have to be extended to a larger memory size, (so, if the maximum value is 16 bits, then the maximum value would be extended to, e.g., 20 bits for the particular epoch column pair.) or the validity predicate in Equation 1 would have to be extended to handle such situations. However, exemplary embodiments neither need the maximum value of bits for storing the sequence of snapshot global timestamp IDs to be increased for overflow situations, nor an extension of the validity predicate, as the application 20 is configured to avoid overflow situations.

To overcome this case, the application 20 is configured to reset snapshot global timestamp ID 101 values as soon as they are not needed anymore by a query snapshot S according to exemplary embodiments. According to exemplary embodiments, the reset must be invisible to queries already running and must not cause a system downtime, i.e., new queries and updates must still be possible even when during reset. The algorithm of the application 20 addresses these issues by introducing two additional epoch columns (second epoch column pair 120): a second create epoch (tc2) and a second end epoch (te2) for each tuple. This allows executing the reset in place without copying the actual data columns 104. The timestamp pair tc2 and te2 of the second epoch column pair 120 are initialized to the same starting values like the other epochs (timestamps) in the first epoch column pair 110 and are adjusted incrementally after modifications by updates to the second epoch column pair 120.

For being able to reset epoch columns of an epoch column pair (either 110 and/or 120) for each tuple, no task must have created a view which references the epoch column pair to be reset. Thus, the reset operation must wait until all old tasks referencing the epoch column pair to be reset finish. To determine when old snapshots are not needed anymore and their snapshot global timestamp IDs hence can be reset, the application 20 counts how many tasks are referencing each epoch column pair with the previously introduced reference counters 112 and 122. Reference counter 112 counts tasks referencing the first epoch column pair 110, and reference counter 122 counts tasks referencing the second epoch column pair 122.

Because new tasks can enter the system 10 at any time, it has to be prevented (by the application 20) that these new tasks create views on the most recent valid data snapshot S referencing the epoch column pair (e.g., the first epoch column pair 110 to be reset. Therefore, in case an overflow for the codes of snapshot global timestamp ID 111 would occur through the next update (i.e. an update referencing the first epoch column pair 110 finished with snapshot global timestamp ID 111=MAX−1), the epoch flag (130) is toggled from true to false. Toggling the epoch flag 130 to false marks the second epoch column pair 120 as the active one which causes new tasks (update and/or queries) to be executed with referencing the second epoch column pair 120 for creating their data views instead of the first epoch column pair 110. Thus, the number of active tasks referencing the first epoch column pair 110 (which is tracked in reference counter 112) is constantly decreasing because old tasks (will) finish at some point in time. In case an overflow for the codes of snapshot global timestamp ID 121 through the next update (i.e. an update referencing the second epoch column pair 120 finished with snapshot global timestamp ID 121=MAX−1), the epoch flag (130) is toggled from false to true. Toggling the epoch flag 130 to true marks the first epoch column pair 110 as the active one which causes new tasks (update and/or queries) to be executed with referencing the first epoch column pair 110 for creating their data views instead of the second epoch column pair 120. Thus, the number of active tasks referencing the second epoch column pair 120 (which is tracked in reference counter 122) is constantly decreasing because old tasks (will) finish at some point in time.

The present approach guarantees that between two overflows (of both, the first epoch column pair 110 and the second epoch column pair 120), the global ID values (either 111 or 121) of the respective inactive epoch column causing an overflow are reset (by the application 20) such that a possible infinite continuous update sequence is possible without corrupting data views of parallel running queries.

For explanation purposes and not limitation, the following examples further describe operations of the application 20 and provide listings 1-6 (which may be included in the application 20) according to exemplary embodiments.

Initial Situation:

Update table T with change set U. Each element of U is a triple consisting of tup—the old tuple data values in the table, the new data values tup', and the update operation opE∈{insert, delete, update}. In the example the table epoch (or table) generally refers to the first and second epoch column pairs 110 and 120. The two table epochs are T.tableEpoch1 and T.tableEpoch2. Accordingly, T.tableEpoch1 is the snapshot global timestamp ID 111 for the first epoch column pair 110 and T.tableEpoch2 is the snapshot global timestamp ID 121 for the second epoch column pair 120. The number of queries referencing them is counted in T.qryCnt1 (112 in FIG. 1) and T.qryCnt2 (122 in FIG. 1) respectively. The currently active epoch pair is determined by the T.firstEpochsActive flag, which is flag 130 in FIG. 1. The table (T.tableEpoch1 and T.tableEpoch2) has several additional flags (for implementation details) indicating in which states the modifying operations are and for synchronizing them. The T.updateRunning flag indicates if an update process is currently active or not, the T.handlingOverflow flag indicates if an asynchronous reset operation is currently running, and T.resetWaiting indicates if the reset thread is still waiting until the rest thread can start working and/or is already resetting the inactive epoch column pair 110 or 120.

Let the minimum epoch be 0 and the maximum epoch value be MAX. Each tuple t of T consists of the data columns and the epoch columns c1 (first create epoch/timestamp), d1 (first delete epoch/timestamp), c2 (second create epoch/timestamps), and d2 (second delete epoch/timestamp) respectively.

Listing 1 shows an example of the modified update algorithm of the application 20. Lines 4 and 96 assure that only one update operation is active on a table (i.e., on the first epoch column pair 110 or on the second epoch column pair 120) which is necessary for avoiding write conflicts. Second, the new update epoch is determined in lines 7-11 as the next in size ID (snapshot global timestamp ID) of the currently active table epoch (on the first epoch column pair 110 or the second epoch column pair 120) and an asynchronous overflow handling is triggered if the maximum epoch value (i.e., maximum size of the snapshot global timestamp ID) would be reached. The update operations are performed batch-wise. This is due to the fact that an asynchronous reset operation may have to wait until update changes its modification behaviour for the inactive epoch column pair after an overflow situation when queries are still referencing the epoch column pair that became inactive. To prevent the reset thread from starving in case the update frequency is very high, the update stops for a while after processing a batch to allow reset to start if possible (lines 26-30 and 36-71). The update behaviour is determined by the resetWaiting flag which is passed in as parameter of the modification algorithms INSERT and DELETE (lines 29, 74-85). Implementing another approach is possible, e.g., with blocking update as long as a reset is running. The blocking update may be considered more disruptive but simplifies the code structure. After update completes, all changes are atomically committed in lines 89-93 with setting the active table epoch to a new value.

Listing 1 Update Main Algorithm:

```
1  TABLE::UPDATE( change set U, int batchSize )
2  BEGIN
3     /** only one update is allowed at the same time **/
4     this->LOCK_FOR_UPDATE( );
5
```

```
6       /** determine the next table epoch **/
7       IF( this->firstEpochsActive == TRUE )
8            newTableEpoch = this->tableEpoch1 + 1;
9       ELSE
10           newTableEpoch = this->tableEpoch2 + 1;
11      ENDIF
12
13      /** handle a possible overflow **/
14      IF( newTableEpoch == MAX )
15           /** epoch overflow handling will block if the
16               last handling did not finish yet and
17               activates the other epoch column pair **/
18           T.HANDLE_OVERFLOW( );
19
20           /** hide current updates from new queries which
21               will reference epoch 0 **/
22           newTableEpoch = 1;
23      ENDIF
24
25      /** perform update operations **/
26      currentTupleNo = 0;
27      this->LOCK_TABLE_STATE_FLAGS( );
28      this->updateRunning = true;
29      resetWaiting = this->resetWaiting;
30      this->UNLOCK_TABLE_STATE_FLAGS( );
31
32      FOR EACH u IN U DO
33           /** periodically check if reset can be started to
34               prevent reset starvation in case of frequent
35               updates before second overflow occurs **/
36           IF( resetWaiting AND
37               ( currentTupleNo MOD batchSize == 0 ) )
38                    /** current batch complete □ change update
39                        behavior if no query is running anymore
40                        to be able to start reset **/
41                    IF( this->GET_OLD_QUERY_COUNT( ) == 0 )
42                         /** pause update until reset runs **/
43                         this->LOCK_TABLE_STATE_FLAGS( );
44                         this->updateRunning = false;
45                         this->UNLOCK_TABLE_STATE_FLAGS( );
46                         WHILE(this->resetWaiting == TRUE ) DO
47                              SLEEP( );
48                         DONE
49
50                         /** resume updating **/
60                         this->LOCK_TABLE_STATE_FLAGS( );
61                         this->updateRunning = true;
62                         this->UNLOCK_TABLE_STATE_FLAGS( );
63
64                         /** from now on, updates on inactive
65                             epoch columns can be directly
66                             applied because no queries are
67                             running on them anymore **/
68                         resetWaiting = false;
69                    ENDIF
70                    currentTupleNo = 0;
71           ENDIF
72
73           /** apply modification operations **/
74           CASE u.op OF
75           insert: this->INSERT( u.tup', newTableEpoch,
76                               resetWaiting );
77           delete: this->DELETE( u.tup, newTableEpoch );
78                               resetWaiting );
79           update: this->DELETE( u.tup, newTableEpoch );
80                               resetWaiting );
81                   this->INSERT( u.tup', newTableEpoch );
82                               resetWaiting );
83           ENDCASE
84           ++currentTupleNo;
85      DONE /** for each update change record **/
86
87      /** finish update **/
88      this->LOCK_TABLE_STATE_FLAGS( );
89      this->updateRunning = false;
90      this->UNLOCK_TABLE_STATE_FLAGS( );
91      IF( this->firstEpochsActive == TRUE )
92           this->tableEpoch1 = newTableEpoch;
93      ELSE
94           this->tableEpoch2 = newTableEpoch;
```

```
95          ENDIF
96
97          /** next update possible **/
98          this->UNLOCK_FOR_UPDATE( );
99    END
```

Listing 2 shows a helper procedure which was introduced for better readability of the bigger code listings. The helper procedure returns the number of queries which are currently running in application 20 referencing the assumed single database table 103 for their snapshot views using the old epoch column pair that became inactive due to an epoch overflow caused by an update. When the epoch flag 130 (firstEpochsActive) is set to true (i.e., currently the first epoch column pair 110 is used for new tasks) all tasks referencing the second epoch column pair 120 are therefore regarded as old. Thus, the respective reference counter 122 (qryCnt2) is returned. Otherwise, when the epoch flag 130 (firstEpochsActive) is set to false (i.e., currently the second epoch column pair 120 is used for new tasks) all tasks referencing the first epoch column pair 110 are therefore regarded as old. Thus, the respective reference counter 112 (qryCnt1) is returned.

Listing 2 Determine Number of Queries Referencing Inactive Epoch Columns:

```
1     integer TABLE::GET_OLD_QUERY_COUNT( )
2     BEGIN
3         IF( this->firstEpochsActive == TRUE )
4             RETURN this->qryCnt2;
5         ELSE
6             RETURN this->qryCnt1;
7         ENDIF
8     END
```

The following procedure in Listing 3 will block the program flow until the last reset of epoch columns finished if an overflow happens again. Usually, the flow should not be blocked if the epoch code size (i.e., the maximum epoch value) was chosen carefully regarding the reset time and update frequency (further with respect to choosing epoch code size is discussed herein). Blocking may be necessary to prevent any possible snapshot corruptions in case the estimated times were wrong and/or it was decided that blocking update is acceptable for the sake of memory needed for each tuple. The thread executing the procedure polls the flag indicating that a reset is still running (lines 5 to 12 and 24 to 31) to synchronize with the executing thread. Polling to synchronize with the executing thread executes the RESET_FIRST/SECOND_EPOCHS( ) procedure. A conditioned wait could be used as an alternative to polling. As last step (line 35), the table flag (e.g., the flag 130) indicating the currently active epoch column pair is toggled. This results in new queries and further updates using the other epoch pair, which is currently active. Queries already running in the system referring to the old epoch column pair will finish in the near future and as soon as this happens, the reset thread spawned in lines 16 to 20 can start working.

Listing 3 Overflow Handling Procedure

```
1     TABLE::HANDLE_OVERFLOW( )
2     BEGIN
3         /** block update if there is already an overflow
4                 handler running which has not finished yet **/
5         DO
6             this->LOCK_TABLE_STATE_FLAGS( );
7             blockUpdate = this->handlingOverflow;
8             this->UNLOCK_TABLE_STATE_FLAGS( );
9             IF( blockUpdate == TRUE )
10                 SLEEP( );
11            ENDIF
12        WHILE( blockUpdate == TRUE );
13
14        /** spawn a new thread for asynchronously resetting the
15                epochs that are currently overflowing **/
16        IF( this->firstEpochsActive == TRUE )
17            SPAWN_THREAD( this->RESET_FIRST_EPOCHS( ) );
18        ELSE
19            SPAWN_THREAD( this->RESET_SECOND_EPOCHS( ) );
20        ENDIF
21
22        /** wait until the reset thread is running to prevent
23                race conditions **/
24        DO
25            this->LOCK_TABLE_STATE_FLAGS( );
26            overflowHandlerRunning = this->handlingOverflow;
27            this->UNLOCK_TABLE_STATE_FLAGS( );
28            IF( overflowHandlerRunning == FALSE )
29                SLEEP( );
30            ENDIF
31        WHILE( overflowHandlerRunning == FALSE );
32
```

```
33          /** now update and new queries can continue working on
34                 the other epochs **/
35          this->firstEpochsActive = ¬ this->firstEpochsActive;
36      END
```

When tuples are newly inserted into the table (database 30), the epoch values for the create-delete epoch pair (tc and te) which are currently not active will be set that the tuple is valid after toggling the table's epoch flag to the other epoch column pair. This is due to the fact that the tuples must be included in views for snapshot S which is created after an overflow was detected. But it is still possible that the tuple is marked as deleted again by following update operations before an overflow happens. In the case an overflow was detected but old queries are still running in the system 10, referencing the now inactive epoch column pair that shall be reset (which can happen when the reset is waiting the old queries to finish), the tuple's inactive create epoch must be set in a way, that these queries evaluate the tuple still as invalid. Evaluating these tuples as invalid can be achieved using the maximum possible value for the creation epoch since it is greater than the table epoch which is at most MAX−1. Thus, the validity predicate createEpoch<=queryEpoch in Equation 1 will evaluate to false for these tuples and they will not be included in views on the active snapshot.

Listing 4 Modified Insert Operation

```
1       TABLE::INSERT( tupleData tup, epochID newEpoch,
2                             Boolean resetWaiting )
3       BEGIN
4           newPhysicalTuple = ALLOCATE_TUPLE_MEMORY( );
5           newPhysicalTuple.data = tup;
6
7           /** determine value for inactive creation epoch column
8                   since old queries might see it during scanning **/
9           IF( resetWaiting == TRUE )
10              /** hide the new tuple from still running queries
11                      referencing the inactive epoch columns after
12                      a previous overflow handling was triggered
13                      but could not start yet **/
14              inactiveCreateEpoch = MAX;
15          ELSE
16              inactiveCreateEpoch = 0;
17          ENDIF
18
19          /** set epoch values **/
20          newPhysicalTuple.d1 = MAX; // not deleted in 1st epochs
21          newPhysicalTuple.d2 = MAX; // not deleted in 2nd epochs
22
23          IF( this->firstEpochsActive == TRUE )
24              newPhysicalTuple.c1 = newEpoch;
25              newPhysicalTuple.c2 = inactiveCreateEpoch;
26          ELSE
27              newPhysicalTuple.c2 = newEpoch;
28              newPhysicalTuple.c1 = inactiveCreateEpoch;
29          ENDIF
30
31          /** atomically insert the entire new tuple **/
32          this->INSERT_ATOMIC( newPhysicalTuple );
33      END
```

The deletion operation needs only to be modified slightly so that the affected tuple is marked as deleted in the currently inactive epochs too, as shown in Listing 5 below. This guarantees that the affected tuple marked as deleted is invisible after an overflow situation. It will be achieved with setting the inactive deletion epoch (te) to the minimal possible value which results in the query predicate queryEpoch<deletionEpoch (of Equation 1) to evaluate always to false, but it must be prevented that the tuple is marked as deleted when old queries are still referencing the inactive epochs (reset waits after an overflow). In this case the value for the deletion epoch is not changed (remains MAX). For these tuples, the correct snapshot S after a second overflow is restored by the reset procedure.

Listing 5 Modified Delete Operation:

```
1       TABLE::DELETE( tupleData tup, epochID newEpoch,
2                             Boolean resetWaiting )
3       BEGIN
4           physicalTuple = this->FIND( tup ); // table scan
5
6           /** determine value for inactive deletion epoch column
7                   since old queries might still reference it **/
8           IF( resetWaiting == TRUE )
9               /** old queries may still reference the tuple
10                      →do not mark it as deleted now - this
11                      will be done by reset **/
12              inactiveDeleteEpoch = MAX;
13          ELSE
14              /** no old query can reference the tuple
15                      →mark it as deleted now because reset might
16                      already have processed this tuple **/
17              inactiveDeleteEpoch = 0;
18          ENDIF
19
20          /** set epoch values **/
21          IF( this->firstEpochsActive == TRUE )
22              physicalTuple.de1 = newEpoch;
23              physicalTuple.de2 = inactiveDeleteEpoch;
24          ELSE
25              physicalTuple.de2 = newEpoch;
26              physicalTuple.de1 = inactiveDeleteEpoch;
27          ENDIF
28      END
```

The resetting of tuple epoch columns can be done asynchronous in parallel to further updates and queries as long as no second overflow occurs because resetting of tuple epoch columns (such as the first epoch column pair 110) must be finished before the epoch flag 130 is toggled again. Otherwise, tuple epochs would be modified that are possibly referenced by running queries which leads to inconsistent snapshot views and therefore wrong query results. Since the evaluation cycle restarts with the minimal possible epoch snapshot global ID (zero in our case), tuples that have been inserted and/or marked as deleted before the previous overflow handling (and therefore use the same epochs that would be valid after the next overflow) must be marked as valid or invalid from the minimal epoch snapshot global ID on. Thus, the entire database table 103 needs to be scanned once to set all values stored for the currently inactive create and delete epoch columns to the minimum. This covers the case when a tuple was created during an update cycle and deleted before an overflow happened. After the reset, this case results in both columns (create timestamp column and end timestamp column) having the minimum value and therefore the query predicate tc≦table epoch (snapshot global ID) on query start <te evaluates to false. Before the reset can be started, it must be waited until the last query referencing the affected epoch columns (epoch column pair) finishes. Waiting until the last query referencing the affected epoch columns (epoch column pair) finishes is done by polling the table's query reference counters (e.g., counter 112 or 122) and could also be implemented with conditioned waits. Additionally, reset must wait until a possible currently running update uses the correct behavior handling inactive epoch columns to prevent that an update is lost in a snapshot created after the next epoch overflow. The following pseudocode shows the resetting procedure for the first epoch columns. The algorithm for the second ones is analogous where only lines 28-31 need to be adjusted in Listing 6. Both methods will be executed by separate threads in parallel to the update procedures.

Listing 6 Resetting Inactive Epoch Columns

```
1   TABLE::RESET_FIRST_EPOCHS( )
2   BEGIN
3               /** synchronize with the update thread **/
4               this->LOCK_TABLE_STATE_FLAGS( );
5               this->handlingOverflow = TRUE;
6               this->UNLOCK_TABLE_STATE_FLAGS( );
7
8               /** start resetting as soon as no query is referencing
9                       the old epoch columns anymore and no concurrent
10                      update process is active or has paused to let this
11                      thread start using the correct behavior for
12                      handling inactive epoch columns in next batches **/
13              DO
14                  this->LOCK_TABLE_STATE_FLAGS( );
15                  this->resetWaiting =
16                          ( this->GET_OLD_QUERY_COUNT( ) > 0 ) OR
17                          ( this->updateRunning == TRUE );
18                  this->UNLOCK_TABLE_STATE_FLAGS( );
19                  IF( this->resetWaiting == TRUE )
20                          SLEEP( );
21                  ENDIF
22              WHILE( this->resetWaiting == TRUE );
23
24              /** scan the table and reset the values for the
25                      currently inactive first epoch columns which
26                      are not referenced by queries anymore **/
27                      FOR EACH t IN T DO
28                  t.c1 = 0;
29                  IF( t.d1 < MAX OR t.d2 < MAX )
30                      t.d1 = 0;
31                  ENDIF
32      DONE
33      this->tableEpoch1 = 0;
34
35      /** now the next overflow can be handled, unblocking a
36          possibly waiting update causing one **/
37      this->LOCK_TABLE_STATE_FLAGS( );
38      this->handlingOverflow = FALSE;
39      this->UNLOCK_TABLE_STATE_FLAGS( );
40  END
```

Figure 5:
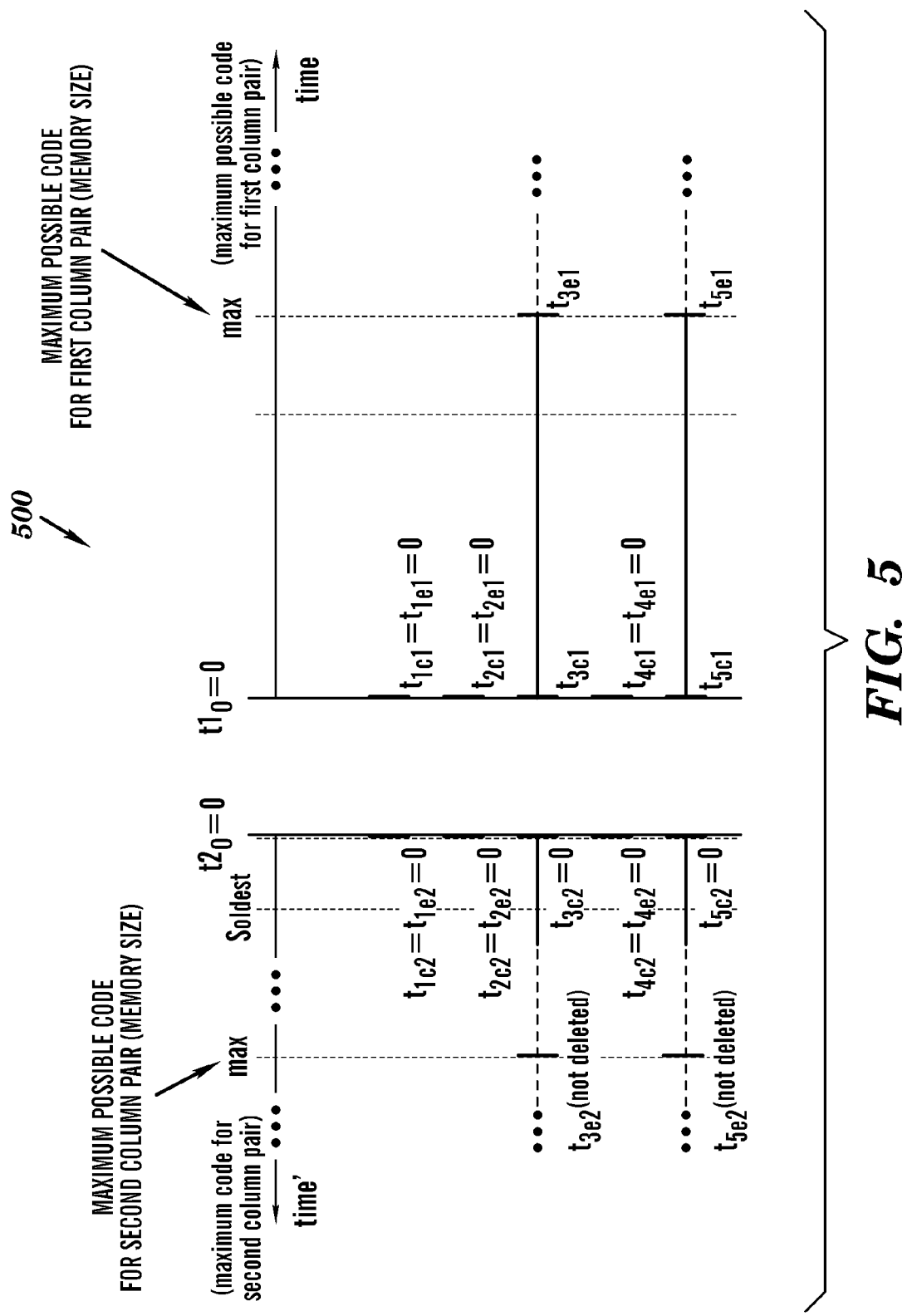
FIG. 5 illustrates a graph in accordance with exemplary embodiments.

Now, turning to FIG. 4, FIG. 4 shows an example where an overflow occurs for the first epoch column pair 110 (on the right side) after an update by the application 20 in accordance with exemplary embodiments. The update process of (the application 20) marks tuple 4 as deleted and inserts tuple 5. Tuples 1 and 2 have been deleted by previous updates. Since tuple 4 cannot be marked as deleted with the currently active first epoch columns, the tuple 4 is marked (by the application 20) using the second epoch column pair 120. After the update finishes, the second epochs (timestamps) in the second epoch column pair 120 are activated (with toggling epoch flag 130) and the first epochs in the first epoch column pair 110 are reset which is illustrated in FIG. 5. In FIG. 5, the reset starts as soon as the query referencing the oldest snapshot ($S_{oldest}$) is using the second epoch column pair 120.

In FIG. 5, in the second epoch column pair 120 (on the left side), the create timestamps (epochs) and end timestamps (epochs) for tuples 1, 2 and 4 are all set to 0 which indicates that these tuples are not valid. Tuples 3 and 5 have their create timestamps set to 0, which is the minimum snapshot global timestamp ID, and their end timestamps ($t3e2$ and $t5e2$) set to the maximum possible snapshot global IDs.

Figure 6A:
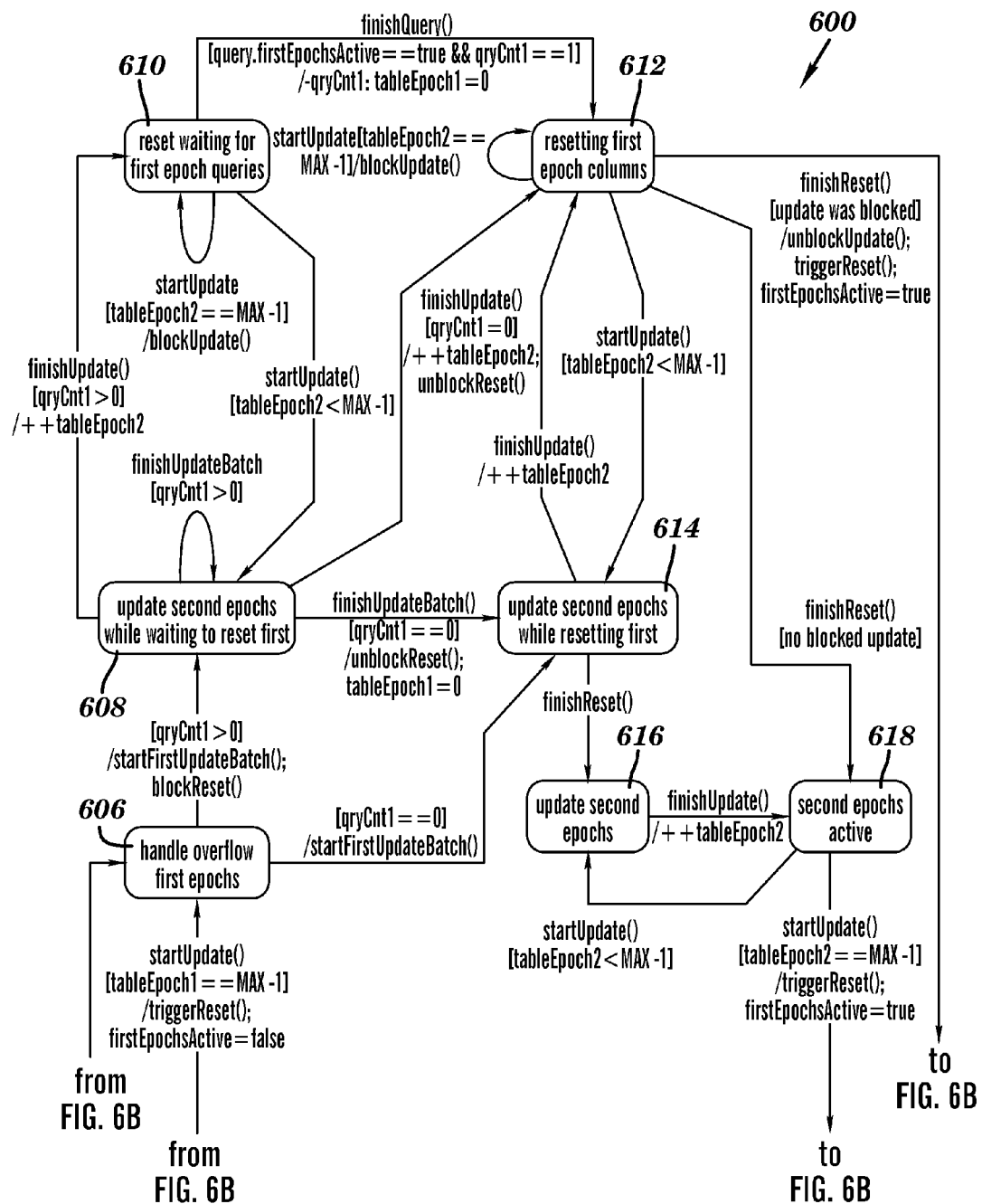
FIGS. 6A and 6B illustrate a flow chart in accordance with exemplary embodiments.
Figure 6B:
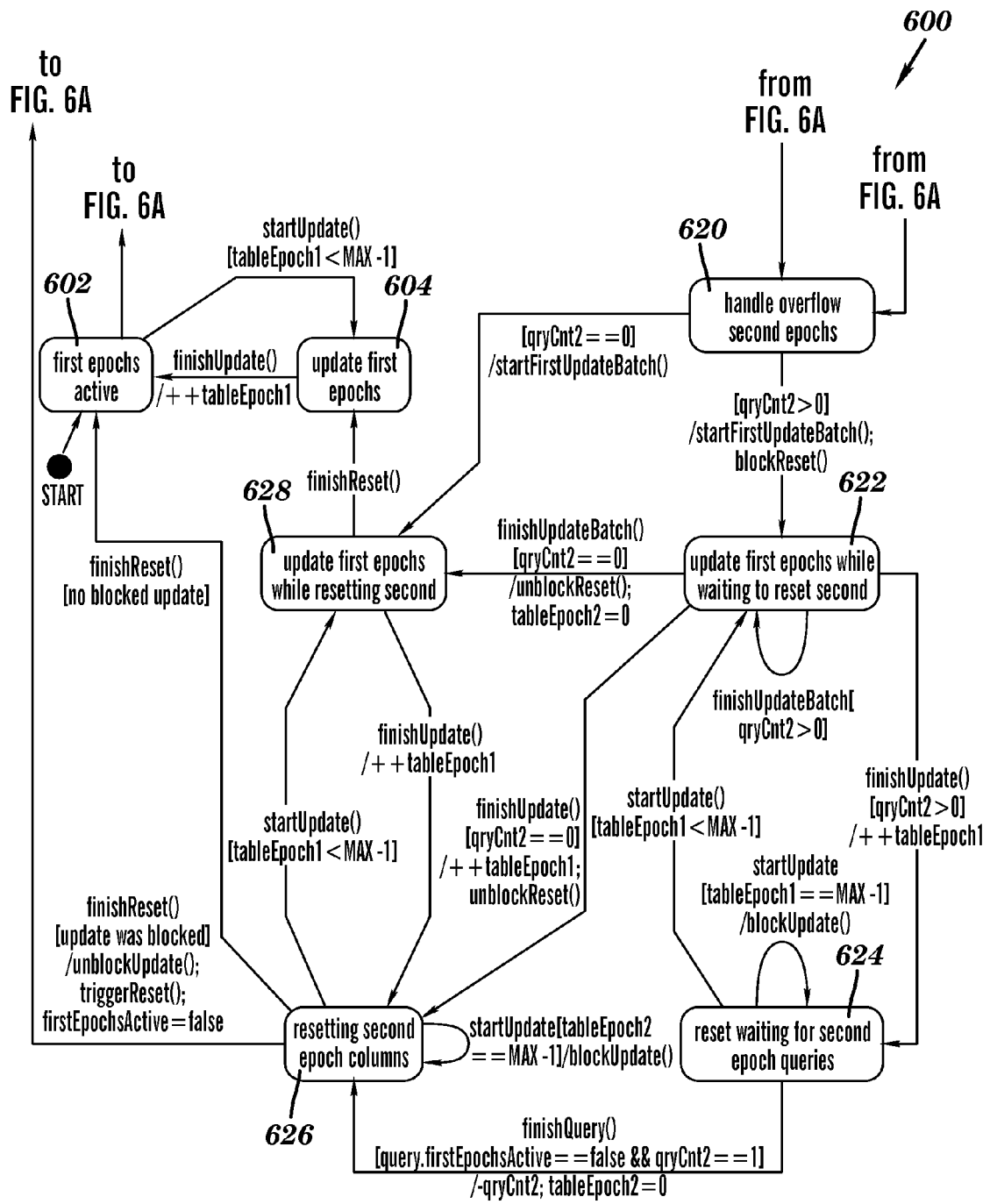

Now turning to FIGS. 6A and 6B, FIGS. 6A and 6B illustrate a flow 600 executed by the application 20 according to exemplary embodiments. The flow 600 ensures that modifications in the first epoch column pair 110 and the second epoch column pair 120 are always hidden from queries.

Note that the flow chart 600 is to be read as a unified modeling language (UML) state chart as referenced in Wikipedia® The Free Encyclopedia under the topic "UML state machine" dated Sep. 16, 2010. Different possible states are in boxes, and arrows indicate state transitions. A state transition is triggered by events and only performed when guard conditions (if any) are fulfilled. When performing a state transition, new actions may be executed.

Syntax:

| triggerEvent( ) |
| --- |
| [guard condition] |
| / actions. |

At operation 602, after the initial load of the table data in the database 30, all epoch (timestamp) values (create timestamps tc and end timestamps te) of the first epoch column pair 110 are initialized to zero by the application 20 and the first epoch column pair 110 is active.

At operation 604, a sequence of update operations (such as queries and tasks causing snapshots S) can be performed increasing the first snapshot global ID in the first epoch column pair 110. These modifications are hidden from queries because they will only be validated with an atomic increment of the first table snapshot global timestamp ID 112. Note, there may be many previous first snapshot global IDs (in the sequence) for the first epoch column pair 110 but there is one present snapshot global ID which is the last in the sequence (max).

At operation 606, as soon as the (first) maximum possible snapshot global epoch value−1 (Max−1) is reached for the first epoch column pair 110, an overflow process handling is performed by the application 20. This overflow handling process occurs before an overflow. In other words, the application 20 does not allow the first snapshot global ID value for the first epoch column pair 110 to reach the first maximum possible snapshot global value (the maximum memory size). When the update commits to cause the overflow, the epoch flag 130 is toggled by the application 20. Overflow handling has begun as discussed herein.

Example state transition from 608 to 614 (finishUpdateBatch( ) [qryCnt1==0],/unblockReset( ), tableEpoch1=0) is executed when a batch of updates (see Listing 1 lines 36-71) has been executed and the number of tasks referencing the first epoch column pair (counted in 112) is zero (i.e. no task is referencing the first epochs anymore). When this state transition is performed, the reset operation (which is blocked and waiting in this source state) is unblocked and can start working (i.e. resetting the values in the first epoch columns) in the target state. Additionally the snapshot global timestamp ID for the first epoch column pair 111 is reset to the initial value zero for providing a valid state for new queries started after the overflow handling.

At operations 616 and 618, updates are made to the second epoch column pair, and at operation 620 the application 20 handles an overflow situation (which is actually a pre-overflow situation) for the second epoch column pair.

Operations 620-628 are executed analogously as for handling the overflow situation for the first epoch column pair and as discussed herein.

To achieve better caching behavior of the used data structures for query processing, exemplary embodiments keep tuple codes as small as possible because more tuples would fit into the processor 60 cache. This leads to better query response times because less costly cache misses occur during the scan phase. To determine the minimum number of bits that are needed for the proposed algorithm of application 20, some workload statistics must be available and/or estimated: the frequency of table data updates, e.g., one update every hour (UF); the maximum execution time of a query (QT); and the time needed to scan the entire database table 103 for resetting the epoch values (RT) of the epoch column pair (110 or 120).

Addition, exemplary embodiments below provide further optimizations of determining the code length/size for the global IDs 111, 121. Let CL be the code length (in number of bits) of the epoch global timestamp ID. This leads to $2^{CL}-2$ possible updates that can be performed on the table before an overflow occurs. The (−2) results from the fact that there are two special epoch ID values, the initial epoch value and the MAX value indicating that a tuple has not been deleted yet and there are at least two epoch values needed for evaluating the tuple validity predicate (Equation 1). The mean time between two overflows OT can be computed with OT=$(2^{CL}-2)$/UF.

This interval must be greater than the time T that is needed to reset epoch values (of the particular epoch column pair) after an overflow because this would block the update process causing the next overflow. Since column epochs (of the epoch column pair) can only be reset after all queries referencing them finished, the reset scan (of the application 20) might have to wait at most QT before the rest scan can start in the worst case. This happens if a query needs the maximum possible execution time and starts at the moment the overflow handling occurs. Therefore, T can be calculated with T=QT+RT which leads to the following in equation $$\frac{2^{CL}-2}{UF} \geq QT + RT.$$

The optimal code length for an epoch column that is needed for being able to process updates without any interruption is CL≧$\log_2$((QT+RT)*UF+2). In most cases, it is adequate to assume that RT≈QT because the epoch column reset can be regarded as a query which performs a single table scan and needs constant time to modify the epoch values per tuple. If it is acceptable that an update process might be blocked T=QT+RT in the worst case, the code length can be reduced even more. But there are at least two bits needed per epoch column because of the initial and MAX value+at least one possible update on them.

Further, in accordance with exemplary embodiments, if tuples are organized in memory blocks and if each memory block has its own create epoch value too, it is possible to omit the tuples' creation epochs (tc) halving the memory 15 overhead. For doing this, all newly inserted tuples must be written into separate (memory) blocks which will become available for the creation of query snapshots atomically after update commits. These "trailing blocks" might be merged atomically with previously created ones (blocks) as soon as no query is referencing the old ones (blocks) anymore to keep memory 15 overhead as low as possible. So, the creation timestamps/epochs are not used but the creation timestamp for each memory block containing a tuple is used instead. Deletion epochs (te) will be kept since random access is needed for them. Omitting the tuple creation epochs (tc) would lead to lower memory 15 requirements for storing the entire table data (i.e., epoch column pair) and better caching behavior since more tuples can be cached for query processing. The number of bits needed to store epoch column values might be computed dynamically based on workload statistics estimating the required times and frequencies. The table data could therefore be transformed to optimize storage layout.

Figure 7:
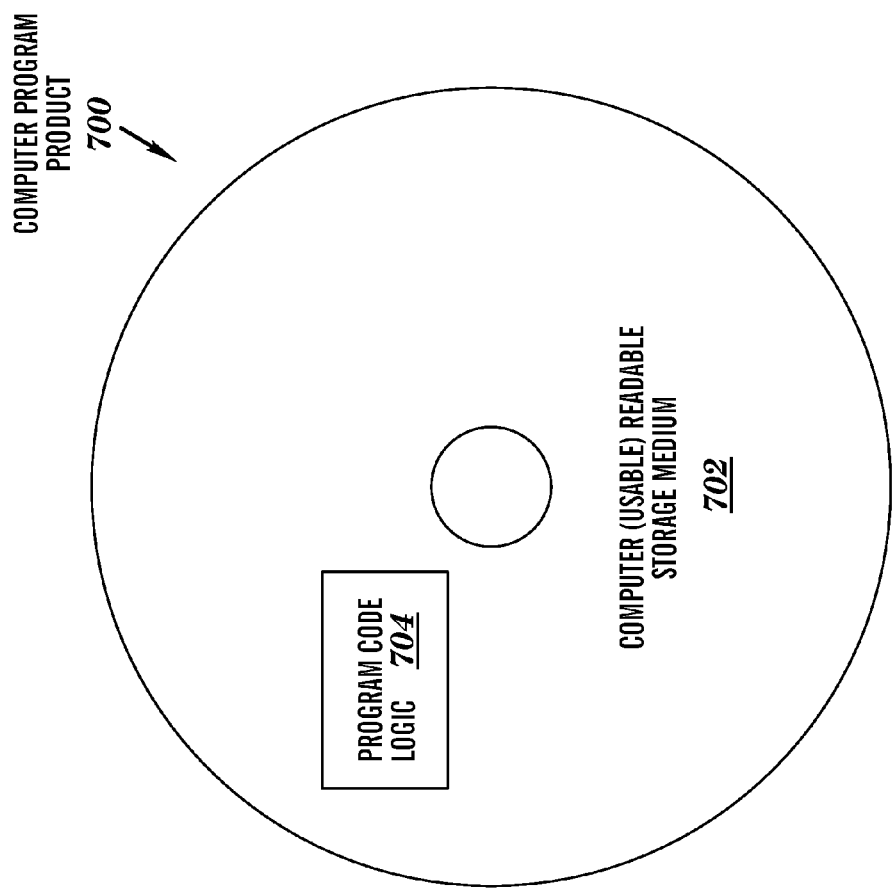
FIG. 7 illustrates a computer program product on a computer readable storage medium in accordance with exemplary embodiments.

As described above, embodiments can be embodied in the form of computer-implemented processes and apparatuses for practicing those processes. In exemplary embodiments, the invention is embodied in computer program code executed by one or more network elements. Embodiments include a computer program product 700 as depicted in FIG. 7 on a computer usable medium 702 with computer program code logic 704 containing instructions embodied in tangible media as an article of manufacture. Exemplary articles of manufacture for computer usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

FIG. 8 illustrates an example of a computer 800 having capabilities, which may be included in exemplary embodiments. Various methods, procedures, modules, flow diagrams, tools, application, and techniques discussed herein may also incorporate and/or utilize the capabilities of the computer 800. Moreover, capabilities of the computer 800 may be utilized to implement features of exemplary embodiments discussed herein. One or more of the capabilities of the computer 800 may implement any element discussed herein and included elements in FIGS. 1-7.

Generally, in terms of hardware architecture, the computer 800 may include one or more processors 810, computer readable storage memory 820, and one or more input and/or output (I/O) devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a data signal processor (DSP), or an auxiliary processor among several processors associated with the computer 800, and the processor 810 may be a semiconductor based microprocessor (in the form of a microchip) or a macroprocessor.

The computer readable memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the computer readable memory 820 may include one or more separate programs, each of which comprises an ordered listing of executable instructions for implementing logical functions. The software in the memory 820 includes a suitable operating system (O/S) 850, compiler 840, source code 830, and one or more applications 860 of the exemplary embodiments. As illustrated, the application 860 comprises numerous functional components for implementing the features, processes, methods, functions, and operations of the exemplary embodiments. The application 860 of the computer 800 may represent numerous applications, agents, software components, modules, interfaces, controllers, etc., as discussed herein but the application 860 is not meant to be a limitation.

The operating system 850 may control the execution of other computer programs, and provides scheduling, input-output control, file and data management, memory management, and communication control and related services.

The application(s) 860 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as (a) an object oriented programming language, which has classes of data and methods, or (b) a procedure programming language, which has routines, subroutines, and/or functions.

The I/O devices 870 may include input devices (or peripherals) such as, for example but not limited to, a mouse, keyboard, scanner, microphone, camera, etc. Furthermore, the I/O devices 870 may also include output devices (or peripherals), for example but not limited to, a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or an intranet. The I/O devices 870 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 860 can be embodied in any computer-readable medium 820 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 820 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 860 is implemented in hardware, the application 860 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 800 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention. While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A computer, comprising:
memory for storing a program;
the memory comprising a first epoch column pair associated with a first global identification (ID), wherein the first global ID has an available first maximum value;
the memory comprising a second epoch column pair associated with a second global identification, wherein the second global ID has an available second maximum value;
wherein the first epoch column pair and the second epoch column pair respectively comprise create timestamps and end timestamps for a plurality of tuples; and
a processor, functionally coupled to the memory, the processor being responsive to computer-executable instructions contained in the program and operative for:
upon receiving first snapshots, increasing the first global ID with each of the first snapshots;
when the first global ID reaches a predefined value, switching to the second global ID associated with the second epoch column pair;
wherein switching to the second global ID associated with the second epoch column pair comprises:
determining that a last update referencing the first epoch column pair finished with the first global ID equal to the available first maximum value minus 1;
based on determining that the first global ID equals the available first maximum value minus 1, toggling a flag to switch to the second global ID associated with the second epoch column pair;
upon receiving second snapshots, increasing the second global ID with each of the second snapshots; and
resetting the first global ID and resetting the first epoch column pair, based on conditions comprising:
determining when tasks are referencing the first snapshots to the first epoch column pair;
when no tasks are referencing the first snapshots, allowing the first global ID to be reset to 0 and allowing the first epoch column pair to be reset;
when there are tuples that are not set to delete in the first epoch column pair, carrying the tuples into the second epoch pair with second create timestamps and second end timestamps; and
when there are the tuples that are not set to delete in the first epoch column pair setting the second create timestamps to 0 and the second end timestamps to the available second maximum value for the second global ID.

2. The computer of claim 1, wherein resetting the first global ID and resetting the first epoch column pair, based on conditions comprises:
when tasks are referencing the first snapshots, waiting until the tasks are finished before resetting the first global ID and resetting the first epoch column pair.

3. The computer of claim 2, wherein when waiting until the tasks are finished before resetting the first global ID and resetting the first epoch column pair, the second snapshots continue to be received to the second epoch column pair; and
wherein no new first snapshots are received to the first epoch column pair while waiting to reset the first epoch column pair.

4. The computer of claim 1, wherein when there are the tuples that are set to delete in the first epoch column pair, carrying the tuples set to delete into the second epoch pair with second create timestamps and second end timestamps both set to 0.

5. The computer of claim 1, wherein when tuples are organized in memory blocks having block timestamps, creation timestamps for the tuples are omitted; and
wherein the block timestamps are utilized as the creation timestamps for the tuples.

6. The computer of claim 1, wherein when the first global ID reaches the predefined value comprises determining that the first global ID reaches the first maximum value minus 1; and
wherein in response to determining that the second global ID reaches the second maximum value minus 1, switching to the first epoch column pair and triggering a further reset of the second global ID and values stored for the second column pair.

7. A computer implemented method for avoiding overflow, comprising:
providing a first epoch column pair associated with a first global identification (ID), wherein the first global ID has an available first maximum value;
providing a second epoch column pair associated with a second global identification, wherein the second global ID has an available second maximum value;
wherein the first epoch column pair and the second epoch column pair respectively comprise create timestamps and end timestamps for a plurality of tuples; and
upon receiving first snapshots, increasing the first global ID associated with each of the first snapshots;
in response to determining that the first global ID reaches the available first maximum value minus 1, switching to the second global ID associated with the second epoch column pair;
wherein switching to the second global ID associated with the second epoch column pair comprises:

determining that a last update referencing the first epoch column pair finished with the first global ID equal to the available first maximum value minus 1;

based on determining that the first global ID equals the available first maximum value minus 1, toggling a flag to switch to the second global ID associated with the second epoch column pair;

upon receiving second snapshots, increasing the second global ID with each of the second snapshots; and resetting the first global ID and resetting the first epoch column pair, based on conditions comprising:

determining when tasks are referencing the first snapshots to the first epoch column pair;

when no tasks are referencing the first snapshots, allowing the first global ID to be reset to 0 and allowing the first epoch column pair to be reset;

when there are tuples that are not set to delete in the first epoch column pair, carrying the tuples into the second epoch pair with second create timestamps and second end timestamps; and when there are the tuples that are not set to delete in the first epoch column pair setting the second create timestamps to 0 and the second end timestamps to the available second maximum value for the second global ID.

8. The method of claim 7, wherein resetting the first global ID and resetting the first epoch column pair, based on conditions comprises:

when tasks are referencing the first snapshots, waiting until the tasks are finished before resetting the first global ID and resetting the first epoch column pair.

9. The method of claim 8, wherein when waiting until the tasks are finished before resetting the first global ID and resetting the first epoch column pair, the second snapshots continue to be received to the second epoch column pair; and wherein no new first snapshots are received to the first epoch column pair while waiting to reset the first epoch column pair.

10. The method of claim 7, wherein when tuples are organized in memory blocks having block timestamps, creation timestamps for the tuples are omitted; and wherein the block timestamps are utilized as the creation timestamps for the tuples.

11. The method of claim 7, wherein in response to determining that the second global ID reaches the second maximum value minus 1, switching to the first epoch column pair and triggering a further reset of the second global ID and values stored for the second column pair.

12. A computer program product for avoiding overflow, the computer program product comprising:

a non-transitory computer readable storage medium having computer readable program code embodied therewith, the computer readable program code when executed by a processor comprising:

providing a first epoch column pair associated with a first global identification (ID), wherein the first global ID has an available first maximum value;

providing a second epoch column pair associated with a second global identification, wherein the second global ID has an available second maximum value;

upon receiving first snapshots, increasing the first global ID with each of the first snapshots;

in response to determining that the first global ID reaches the first maximum value minus 1, switching to the second global ID associated with the second epoch column pair;

wherein switching to the second global ID associated with the second epoch column pair comprises:

determining that a last update referencing the first epoch column pair finished with the first global ID equal to the available first maximum value minus 1;

based on determining that the first global ID equals the available first maximum value minus 1, toggling a flag to switch to the second global ID associated with the second epoch column pair;

upon receiving second snapshots, increasing the second global ID with each of the second snapshots; and resetting the first global ID and resetting the first epoch column pair, based on conditions comprising:

determining when tasks are referencing the first snapshots to the first epoch column pair;

when no tasks are referencing the first snapshots, allowing the first global ID to be reset to 0 and allowing the first epoch column pair to be reset;

when there are tuples that are not set to delete in the first epoch column pair, carrying the tuples into the second epoch pair with second create timestamps and second end timestamps; and when there are the tuples that are not set to delete in the first epoch column pair setting the second create timestamps to 0 and the second end timestamps to the available second maximum value for the second global ID.

13. The computer program product of claim 12, wherein resetting the first global ID and resetting the first epoch column pair, based on conditions comprises:

when tasks are referencing the first snapshots, waiting until the tasks are finished before resetting the first global ID and resetting the first epoch column pair.

* * * * *